United States Patent [19]

Takeshita

[11] Patent Number: 5,293,363
[45] Date of Patent: Mar. 8, 1994

[54] OPTICAL HEAD APPARATUS WITH LIGHT WEIGHT MOVABLE LENS HOLDER

[75] Inventor: Nobuo Takeshita, Nagaokakyo, Japan

[73] Assignee: Mitsubishi Denki Kabushiki Kaisha, Tokyo, Japan

[21] Appl. No.: 32,418

[22] Filed: Mar. 15, 1993

Related U.S. Application Data

[63] Continuation of Ser. No. 595,581, Oct. 11, 1990, abandoned.

[30] Foreign Application Priority Data

Oct. 13, 1989 [JP] Japan .................. 1-266684

[51] Int. Cl.$^5$ .......................... G11B 7/00; G11B 21/00
[52] U.S. Cl. ......................... 369/44.21; 369/44.17; 369/44.14; 369/44.11; 369/112; 359/823
[58] Field of Search ............ 369/44.11, 44.14, 44.17, 369/44.16, 44.21, 112; 359/813, 814, 823, 824

[56] References Cited

U.S. PATENT DOCUMENTS

| | | | |
|---|---|---|---|
| 4,566,089 | 1/1986 | Kime | 369/44 |
| 4,766,583 | 8/1988 | Oinoue et al. | 369/44.16 |
| 4,792,935 | 12/1988 | Kime et al. | 369/45 |
| 4,887,888 | 12/1989 | Nose | 369/44.17 |
| 4,942,562 | 7/1990 | Suzuki | 369/44.21 |
| 4,958,336 | 9/1990 | Suzuki et al. | 369/44.21 |
| 4,969,715 | 11/1990 | Nishihara et al. | 369/44.11 |
| 5,195,074 | 3/1993 | Tanoshima et al. | 369/44.11 |

FOREIGN PATENT DOCUMENTS 60-239943 11/1985 Japan .

*Primary Examiner*—Jeffery Brier
*Assistant Examiner*—Khoi Truong
*Attorney, Agent, or Firm*—Wolf, Greenfield & Sacks

[57] ABSTRACT

An optical head apparatus wherein a lens holder which holds an objective lens for condensing a light beam on an optical recording medium is turned in a plane perpendicular to an optical axis of the objective lens and one portion of construction members of turning unit for performing a tracking control for the optical recording medium is fixed to a fixed body. One or some of construction members of the turning unit for tracking control is not mounted to a moving body for supporting the lens holder but is mounted to the fixed body, as a result, weight of a movable unit including the moving body and its loading members is to be reduced to realize high-speed access with respect to the optical recording medium.

12 Claims, 10 Drawing Sheets

OPTICAL HEAD APPARATUS WITH LIGHT WEIGHT MOVABLE LENS HOLDER

This application is a continuation of application Ser. No. 07/595,581, filed Oct. 11, 1990 now abandoned.

BACKGROUND OF THE INVENTION

1. Field of the Invention

The present invention relates to an optical head apparatus which records or reproduces data in or from an optical recording medium, such as an optical disk.

2. Description of Related Art

There is a great demand that an optical disk apparatus, as an outer storage device of a computer, for example, should be put into practical use or heightened its performance, because it has a large capacity and is capable of non-contact recording, reproducing, and the like. As compared with a magnetic disk apparatus that is widely known and used, the optical disk apparatus is inferior in its high-speed accessibility. However, if with a new type of the optical disk apparatus introduced, the inferior high-speed accessibility will be improved to be superior to the magnetic disk apparatus, in addition to its exchangeability with a recording medium, it will easily be understood that the optical disk apparatus is to replace the magnetic disk apparatus.

One type of improving the high-speed accessibility in the optical head apparatus is that a light source, a light-receiving unit, and the like are fixedly provided, and an actuator for objective lens, separately provided therein alone is made access with respect to a disk so that weight of a movable unit can be reduced. Naturally, in this actuator separation type, it is important to lighten the weight of the movable unit. During a high-speed access, the other type, that will be described later, of performing focusing control and tracking control for the disk by sliding or turning the movable unit around a pole hardly generates unnecessary vibration owing to unbalance and the like as compared with other types. So, this type is advantageous for the high-speed access.

Figure 1:
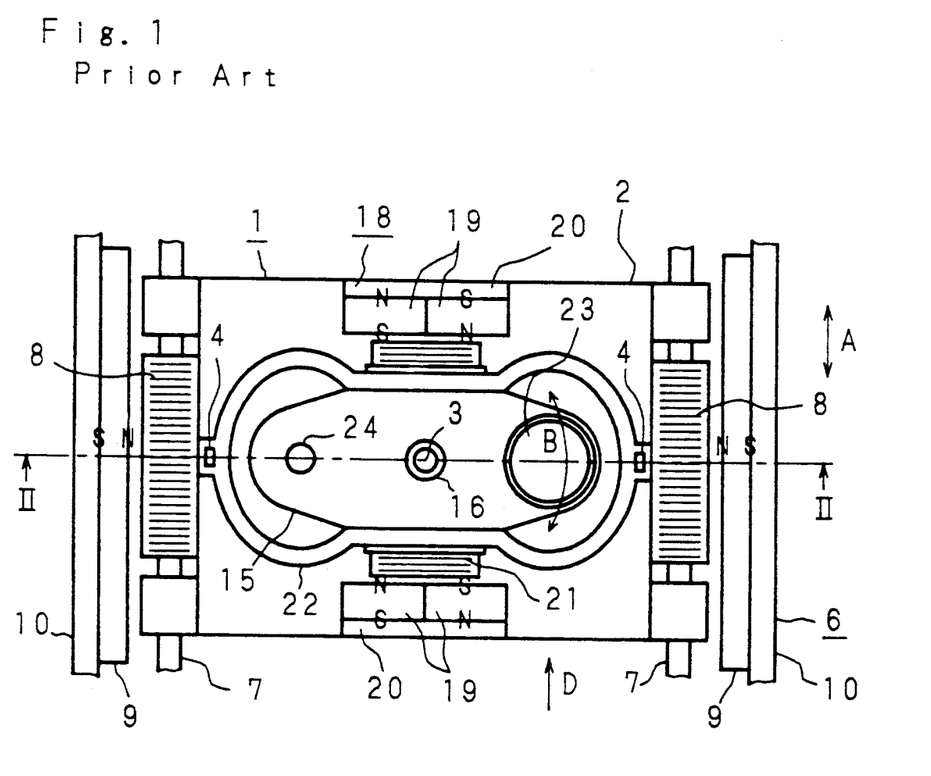
FIG. 1 is a plan view the optical head apparatus of prior art.
Figure 2:
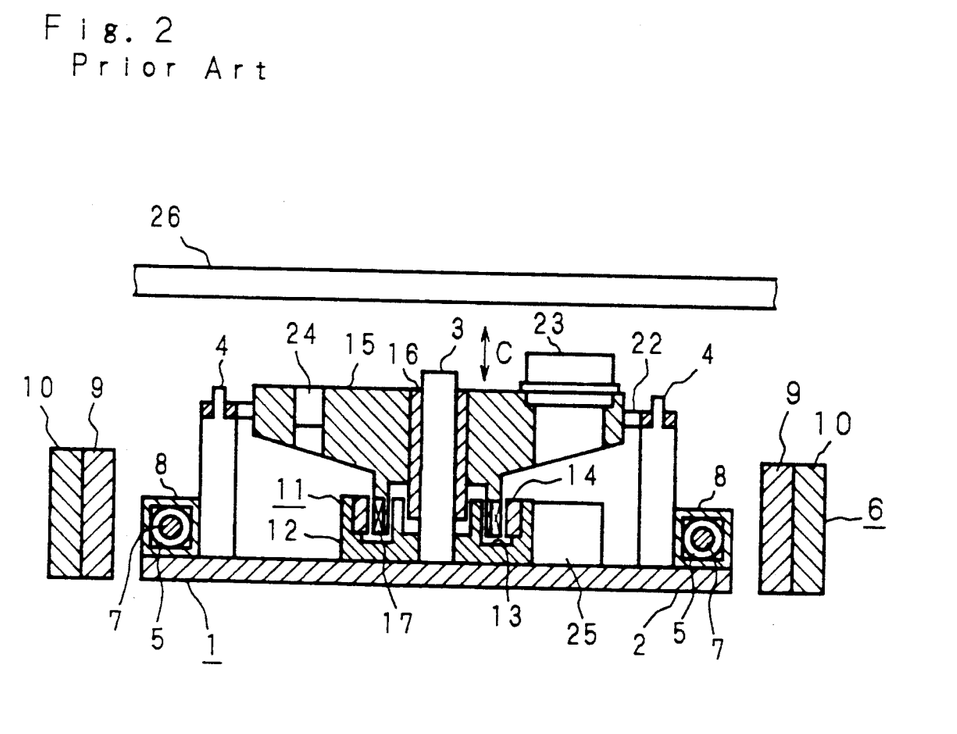
FIG. 2 is a sectional view taken generally along the line II—II of FIG. 1.
Figure 3:
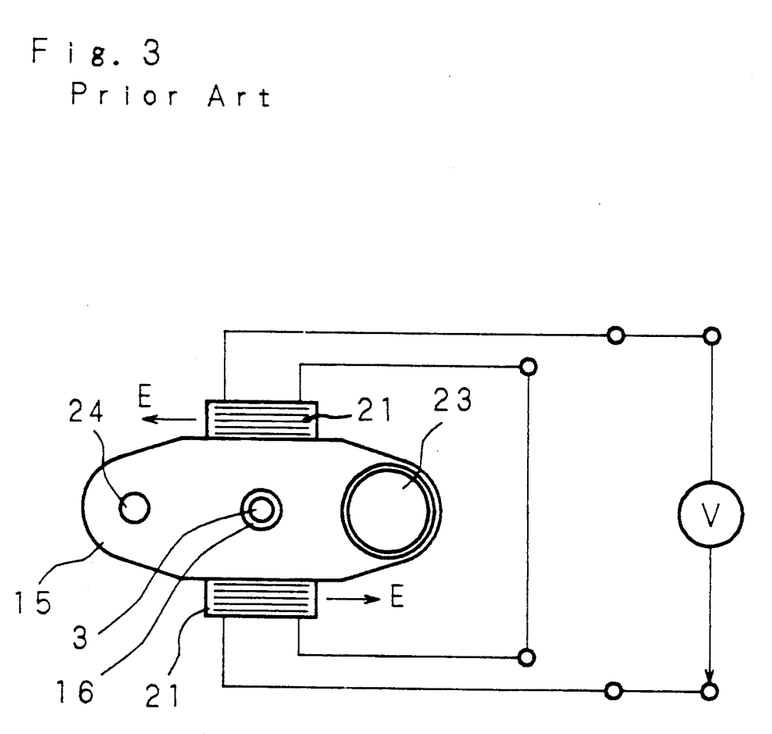
FIG. 3 is a connection diagram of a tracking control coil of the optical head apparatus of FIG. 1.

FIG. 1 is a plan view to illustrate the optical head apparatus of prior art, FIG. 2 is a sectional view taken generally along the line II—II of FIG. 1, and FIG. 3 is a connection diagram of a tracking control coil of the optical head apparatus shown in FIG. 1. FIG. 2 also illustrates a disk that will be referred to later. In these figures, reference numeral 1 designates a moving body which is comprised of a base 2, a pole 3 mounted at right angles to the center of the base 2, a damper fixing pin 4 provided at both ends of the base 2, and a bearing 5 provided at four corners of the base 2.

Reference numeral 6 designates first moving means, which is comprised of a guide 7 made of iron being fit into the bearing 5, a linear motor coil 8 fixedly provided to both ends of the base 2 in FIG. 1 in a manner of surrounding the guide 7, a linear motor magnet 9 provided in parallel to the guide 7 and in proximity to the coil 8, and a linear motor yoke 10 provided adjacent to the magnet 9. Meanwhile, fine lines shown in the coil 8 designate the direction to which the coil 8 is rolled (each coil that will be referred to later is the same as this). And characters N and S shown in the magnet 9 designate polarities (each magnet that will be referred to later is the same as this). The guide 7, magnet 9, and yoke 10 are fixed to a fixed body (not shown) which is comprised of a frame body, a box body or the like, and the moving body 1 is guided by the guide 7 and is movable in the direction A. The guide 7 is connected to the yoke 10 in the upper and the lower portions of FIG. 1 (not shown).

Reference numeral 11 designates second moving means, which is comprised of a cylindrical focusing control yoke 12 with a circular ditch 13 being provided in the central portion of the base 2, a cylindrical focusing control magnet 14 provided at a side surface of the ditch 13, and a cylindrical focusing control coil 17 provided at the lower portion in FIG. 2 of a lens holder 15 that will be referred to later and in a position confronting the magnet 14 inside the ditch 13. There is provided the lens holder 15 around the pole 3 via a cylindrical movable bearing 16. The lens holder 15 is rotatable around the pole 3 in the direction B and is also slidable along the pole 3 in the direction C. Reference numeral 18 designates turning means, which is comprised of a tracking control magnet 19 provided to the base 2 above and below the lens holder 15 in FIG. 1, a tracking control yoke 20 provided to the base 2 being adjacent to the magnet 19, and a tracking control coil 21 provided in the lens holder 15.

The lens holder 15 is provided with a damper 22, which is locked by the damper fixing pin 4, generating a directional force of putting the lens holder 15 back to a neutral position when the lens holder 15 is shifted from the position. At one end of the lens holder 15, there is held an objective lens 23 whose optical axis is in parallel to the pole 3. And at the other end of the lens holder 15, there is provided a counter weight 24 which sustains balance between the lens holder 15 and the pole 3. On the base 2, below the objective lens 23 in FIG. 1 there is provided a reflecting mirror 25 which allows a light beam being incident in the direction D to reflect upon the objective lens 23. Above the pole 3 is positioned a disk 26 which is an optical recording medium. The center of the disk 26 is supported by the fixed body, and the disk 26 is adapted to rotate in a plane perpendicular to the optical axis of the objective lens 23.

Now will be described below the operation of the optical head apparatus of prior art. When data is recorded or reproduced, the disk 26 is rotated, and light beam emitted from a fixed optical system (not shown) including a light source becomes incident on the optical head apparatus in the direction of the arrow D and is reflected by the reflecting mirror 25, and, then, is turned 90 degrees, following which being focused on the disk 26 via the objective lens 23. While the access with respect to a desired track (not shown) on the disk 26 is performed, various kinds of control are done to allow the objective lens 23 to follow the disk 26 to cope with the surface deflection and decentering of the disk 26. Tracks on the disk 26 are provided above the objective lens 23 in a depth direction in FIG. 2. When it is desired to perform the access of the objective lens 23 with respect to the desired track, the linear motor coil 8 is energized. Because the coil 8 is located in a magnetic field of the linear motor magnet 9, a force is generated by energizing and the moving body 1 on which the coil 8 is mounted is moved in the direction A. There is no problem if the polarities N and S of the magnet 9 are opposite to those shown in the figure (the same as polarities of other magnets).

After that, fine adjustment is done for accurate tracking control against the decentering and the like of the disk 26. When a DC voltage V is applied to energize the tracking control coil 21 in a magnetic field of the tracking control magnet 19 as shown in the connection diagram of FIG. 3, couple of force in the direction of the arrow E, for example, is generated and then the lens holder 15 is rotated around the pole 3 against the force of the damper 22, moving the objective lens 23 in the direction B. In addition to this, adjustment of the position of the objective lens 23 is done in the direction C so that the light beam can correctly be focused in spite of the surface deflection and the like of the disk 26. To perform this focusing control, the focusing control coil 17 in a magnetic field of the focusing control magnet 14 is energized, and then a force acting in the direction C is generated to move the lens holder 15 on which the objective lens 23 is mounted.

Such an optical head apparatus of prior art has thus been constructed. As it is provided with the whole turning means 18 for tracking control on the moving body 1, weight of the movable unit including the moving body 1 and its loading members becomes larger. Accordingly, this larger weight becomes an obstacle to the high-speed access with respect to the disk 26.

SUMMARY OF THE INVENTION

A primary of the present invention is to provide an optical head apparatus which is capable of performing a high-speed access because of the light weight of the movable unit.

The optical head apparatus of the present invention is characterized in that one or some of construction members of turning means for tracking control is provided not in a moving body but in a fixed body.

The optical head apparatus of the present invention is provided with an objective lens which condenses a light beam on an optical recording medium, a lens holder which holds the objective lens, turning means for turning the lens holder in a plane perpendicular to an optical axis of the objective lens, and a fixed body to which one portion of the turning means is fixed.

The optical head apparatus of the present invention is further provided with a moving body which rotatably supports the lens holder in the plane perpendicular to the optical axis of the objective lens and which is movable with respect to the fixed body, first moving means for moving the moving body with respect to the fixed body, and second moving means for moving the moving body in the direction of the optical axis of the objective lens.

The turning means is comprised of a magnet, a first yoke provided adjacent to the magnet, two coils positioned at both ends of the lens holder and in a magnetic field of the magnet, and a second yoke provided in a manner of going through a hollow portion of each coil, the magnet, first yoke and second yoke being fixed to the fixed body. Both of the magnet and first yoke are used both in the turning means and in the first moving means.

In the optical head apparatus of the present invention, since one or some of construction members of the turning means for tracking control is fixed not to the moving body but to the fixed body, weight of the movable unit including the moving body and its loading members is reduced. So it is capable of performing a high-speed access with respect to the optical recording medium.

The above and further objects and features of the invention will more fully be apparent from the following detailed description with accompanying drawings.

DESCRIPTION OF THE PREFERRED EMBODIMENTS

Now will be referred to preferred embodiments of the present invention in detail with attached drawings.

Figure 4:
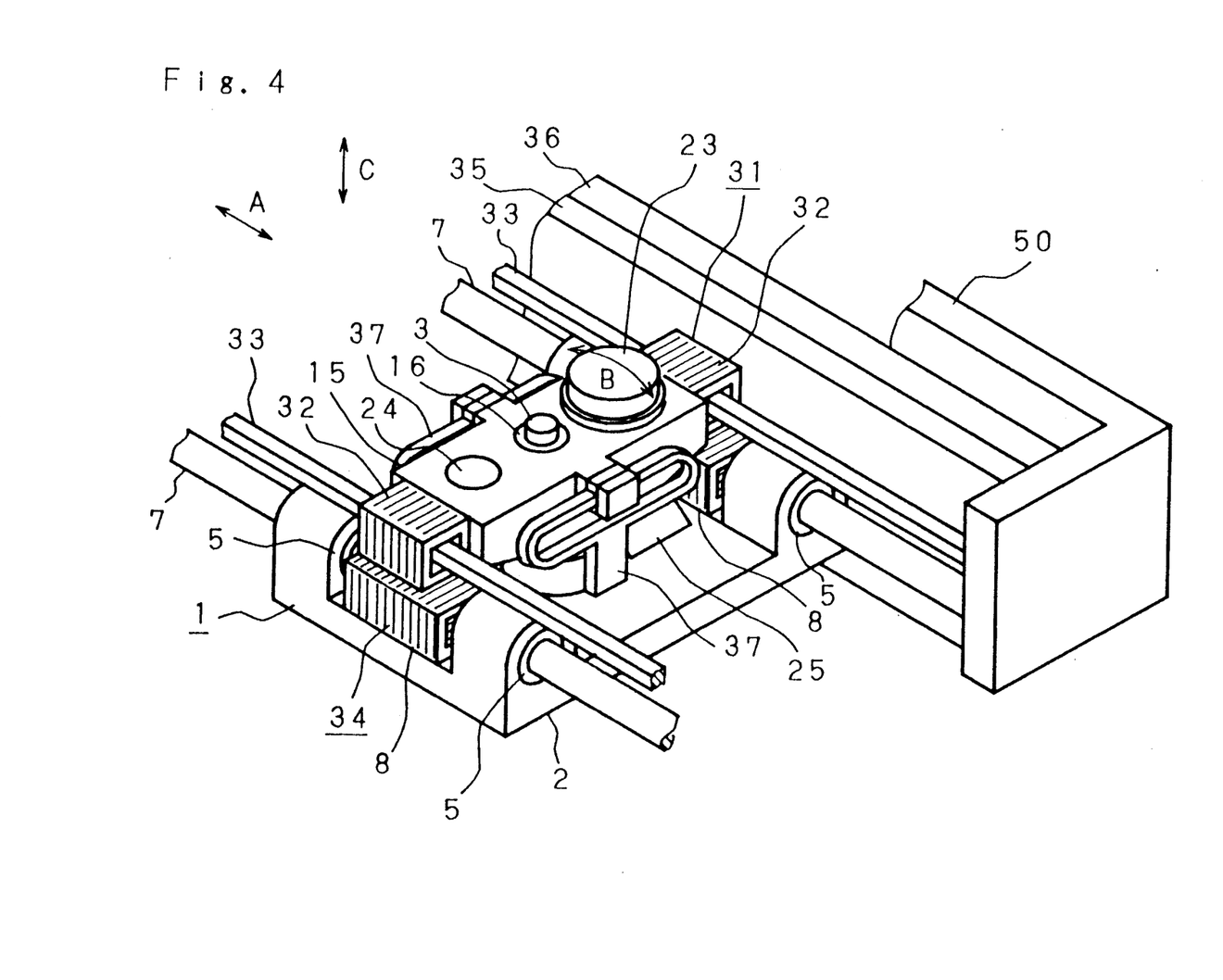
FIG. 4 is a perspective view of an optical head apparatus of one preferred embodiment of the present invention.
Figure 5:
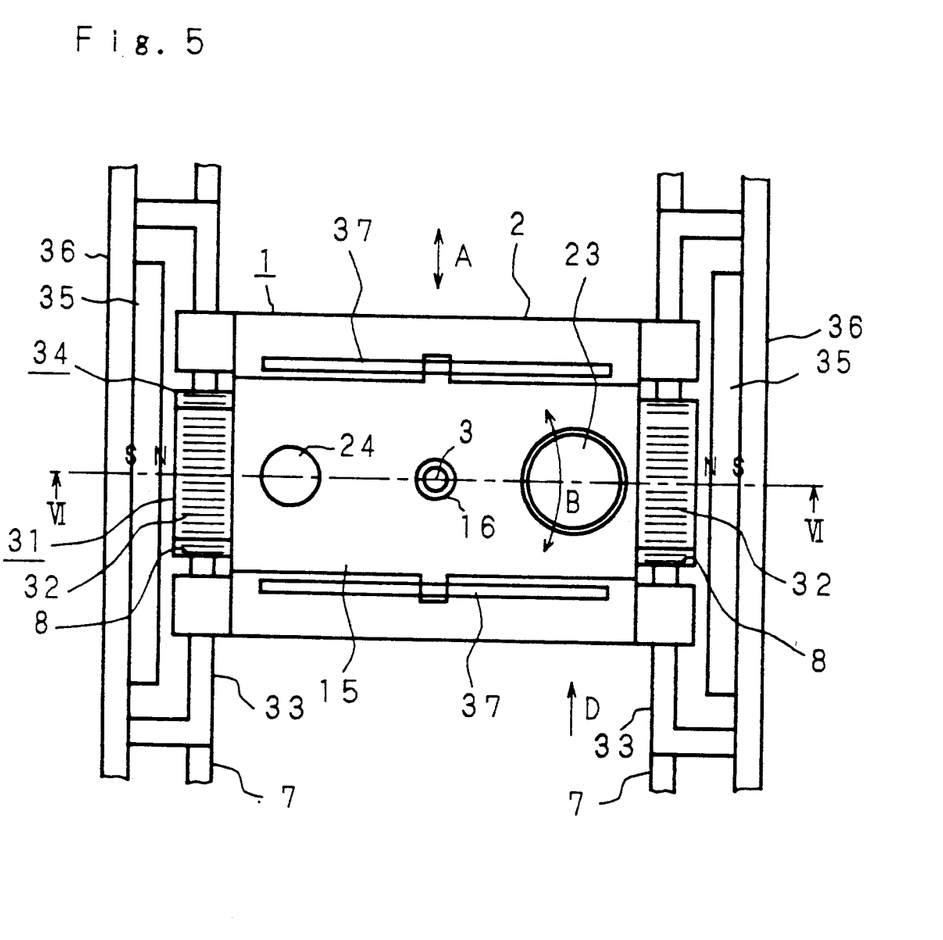
FIG. 5 is a plan view of the optical head apparatus of one preferred embodiment of the present invention.
Figure 6:
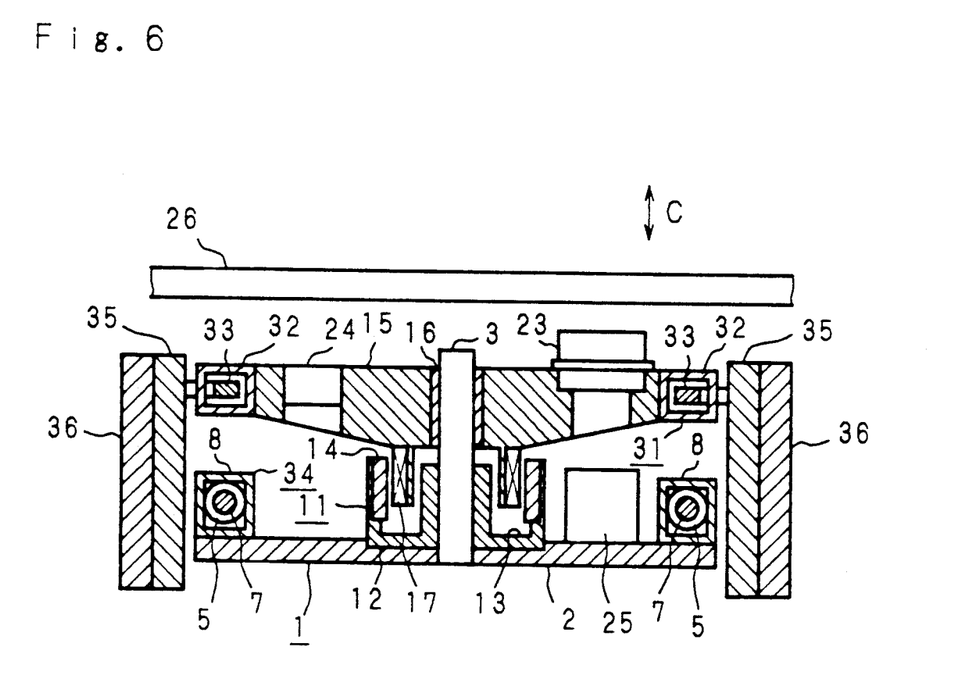
FIG. 6 is a sectional view taken generally along the line VI—VI of FIG. 5.

FIG. 4 through 6 show one preferred embodiment of the present invention. In FIG. 4, each one of two fixed magnets and two fixed yokes that will be described later has been omitted, but a fixed body which is not shown in other figures is shown here. In FIG. 6, a disk is shown which is not shown in other figures. In the optical head apparatus of one embodiment of the present invention illustrated in those figures, those members 2-26 numbered identically with the optical head apparatus of prior art of FIG. 1-3 perform the same or similar functions, so explanation on those members has been omitted.

Reference numeral 1 designates a moving body which is comprised of a base 2, a pole 3, and a bearing 5. Reference numeral 31 designates turning means for performing a tracking control by turning a lens holder 15, which is comprised of a tracking control coil 32 provided at both ends of the lens holder 15, a tracking control yoke 33 provided in a manner of going through a hollow portion of the coil 32, a fixed magnet 35 provided in parallel to a guide 7 and in proximity to both a linear motor coil 8 and the coil 32, and a fixed yoke 36 provided adjacent to the fixed magnet 35. The fixed yoke 36 is connected to the guide 7 in the upper and lower portions in FIG. 5 (not shown) as well as to the yoke 33. And the guide 7, yoke 33, fixed magnet 35 and fixed yoke 36 are all fixed to a fixed body 50. Reference numeral 34 designates first moving means, which is comprised of the guide 7, the linear motor coil 8, the fixed magnet 35, and the fixed yoke 36. Reference numeral 11 designates second moving means, which, in the same way as the embodiment of the prior art, is comprised of a focusing control yoke 12, a focusing control magnet 14, and a focusing control coil 17.

As may be seen from the above description, the fixed magnet 35 and the fixed yoke 36 are used both in the turning means 31 and in the first moving means 34. On the base 2, there is provided a damper 37, one portion of which is engaged in the lens holder 15, thereby exerting a force of putting the lens holder 15 back when the lens holder 15 is shifted from a neutral position.

Now will be described below the operation of the optical head apparatus of this embodiment. When it is desired to perform access of the objective lens 23 with respect to a desired track of the disk 26, the linear motor coil 8 is energized. Since the coil 8 is located in a magnetic field of the fixed magnet 35, a force is generated by energizing to move the moving body 1 in the direction A. And the tracking control coils 32 is energized so that accurate tracking control can be performed coping with decentering and the like of the disk 26. The coil 32 is also located in the magnetic field of the fixed magnet 35, accordingly, a force is generated. Two coils 32 are connected with each other so that a direction of the force acting upon the two coils 32 can be opposite to each other in the direction A. As a result, the lens holder 15 rotates around the pole 3 and the objective lens 23 moves in the direction B. The method of focusing control for the surface deflection and the like of the disk 26 being the same as the embodiment of prior art, explanation on this has been omitted.

Compared with the embodiment of prior art, a distance between the two tracking control coils 32 can be longer in this embodiment, accordingly, moment of the couple of force acting upon these coils 32 can be larger. In addition, the fixed magnet 35 and the fixed yoke 36 are used both in the turning means 31 and in the first moving means 34, which enables construction of the optical head apparatus to be simplified. Furthermore, since a reaction force of turning the lens holder 15 acts not upon the base 2 but upon the fixed magnet 35 and the like, the reaction force is not liable to affect operation of the base 2.

Figure 7:
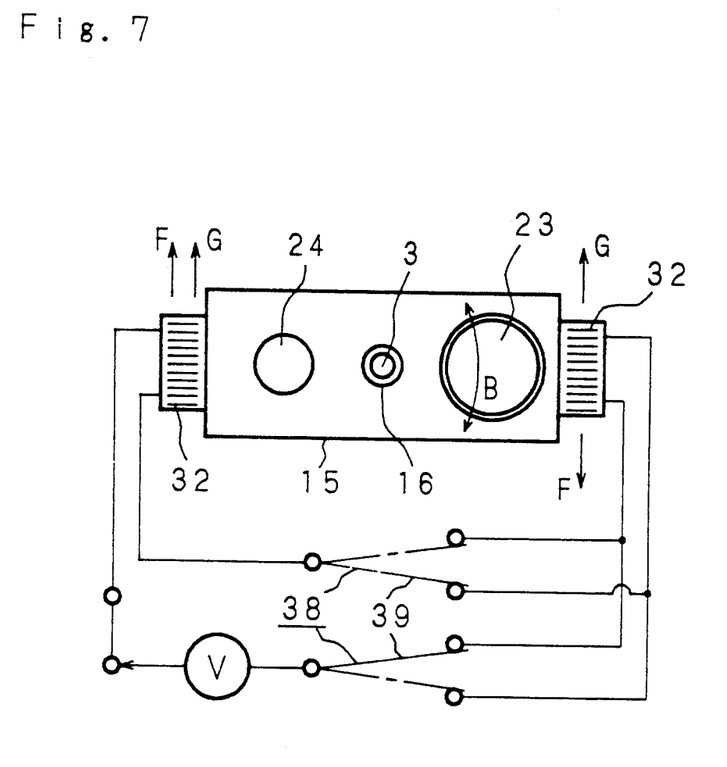
FIG. 7 is a connection diagram of a tracking control coil of an optical head apparatus of another embodiment of the present invention.

FIG. 7 is a connection diagram of a tracking control coil of the optical head apparatus of another embodiment of the present invention, and construction of the whole optical head apparatus is similar to that shown in FIGS. 4-6 except that the connection between two tracking control coils 32 can be changed over in this embodiment. In FIG. 7, reference numeral 38 designates a changeover switch, which is connected so that the direction of an electric current flowing in the tracking control coil 32 located in the right side in the figure can be reversed by changing over a movable contact 39 from the state shown by full line in the figure to that shown by dashed line.

Now will be described below the operation of the optical head apparatus of this embodiment. When the movable contact 39 of the changeover switch 38 is allowed to be of the state shown by the full line and a DC voltage V is applied to energize the tracking control coil 32, such couple of force as shown by the arrow F, for example, is generated, and a lens holder 15 is rotated around a pole 3, and then an objective lens 23 is moved in a clockwise direction B. If it is desired to move the objective lens 23 in a counterclockwise direction, a direction of the voltage and current is to be opposite to the above. With the above operation, turning means 31 for tracking control is operated. On the other hand, when first moving means 34 shown in FIGS. 4-6 is operated, the linear motor coil 8 is energized to move the moving body 1 in the direction A, that is, the upward direction in FIG. 5, for example, at the same time the movable contact 39 of the changeover switch 38 is allowed to be of the state shown by the dashed line in FIG. 7 to energize the coil 32. And the force acting upon the coil 32 provided at the right side in FIG. 7 reverses the direction F and directions of the force acting upon the both coils 32 become the same direction G, thereby accelerating a moving body 1, as a result, it becomes possible to perform high-speed access. If it is desired to give the force in the downward direction in FIG. 7, the direction of the voltage and current is to be opposite to the above.

Figure 8:
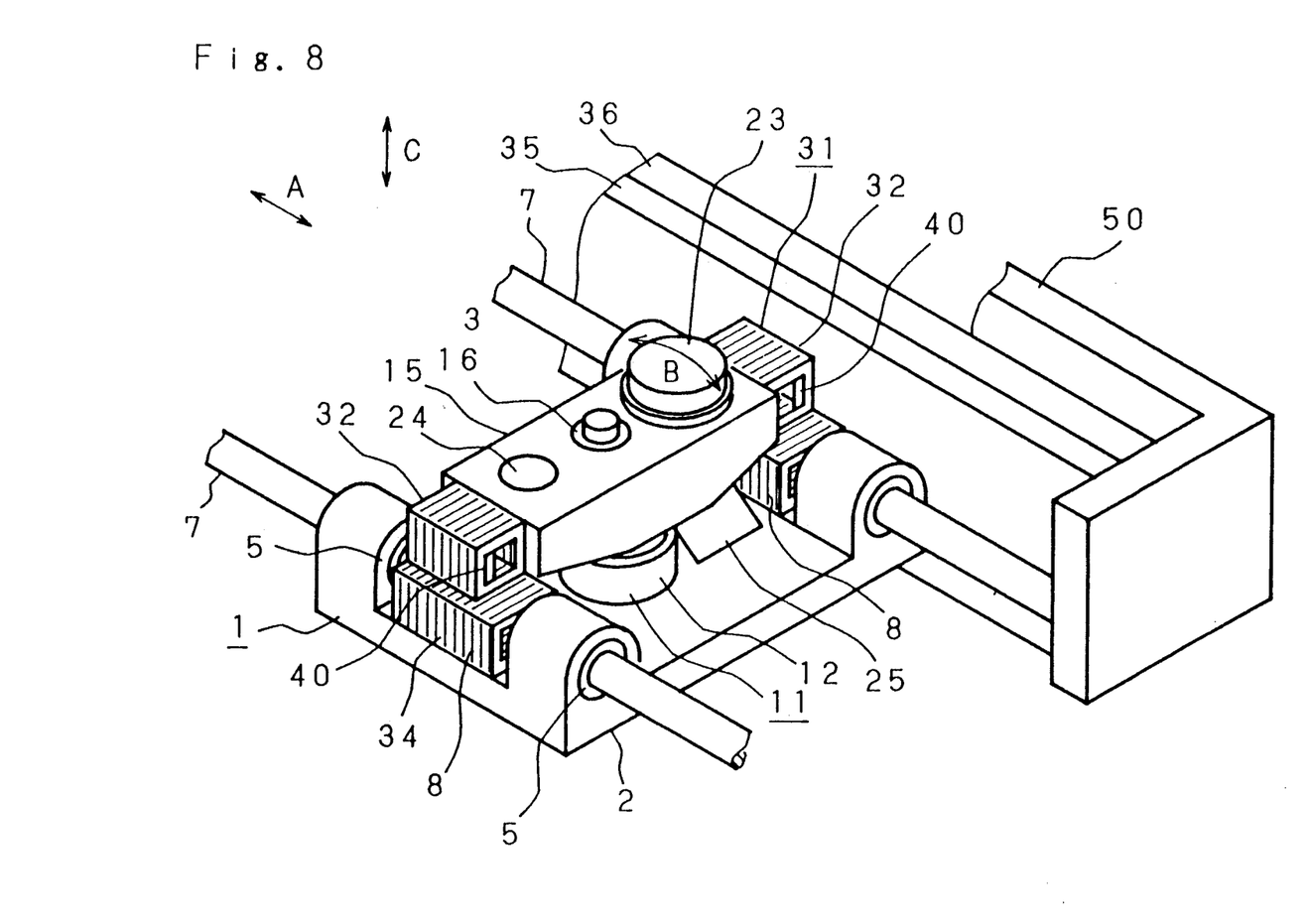
FIG. 8 is a perspective view of an optical head apparatus of further embodiment of the present invention.
Figure 9:
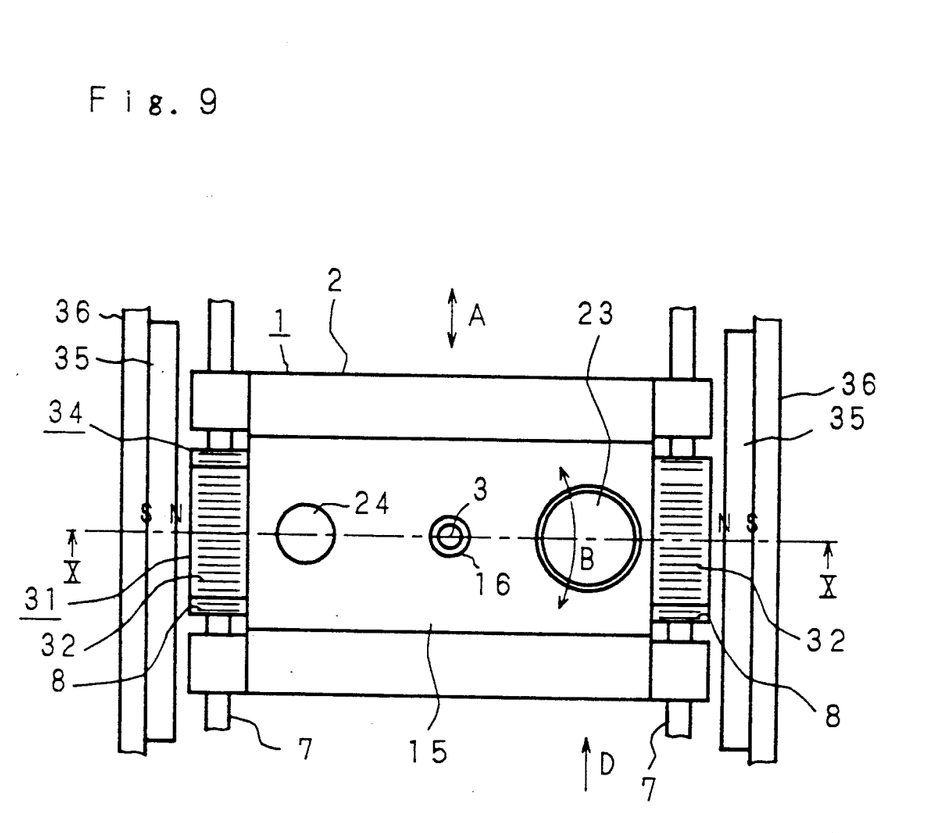
FIG. 9 is a plan view of the optical head apparatus of further embodiment of the present invention.
Figure 10:
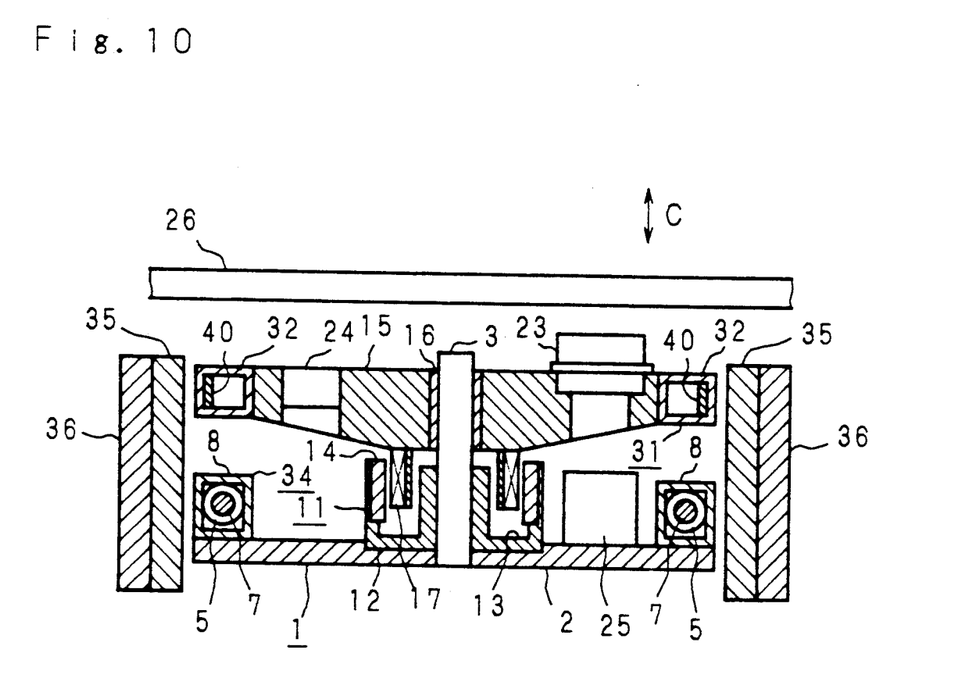
FIG. 10 is a sectional view taken generally along the line X—X of FIG. 9.

FIGS. 8 through 10 illustrate further embodiment of the present invention. In these figures, reference numeral 40 designates a magnetic substance which is provided in the hollow portion of a tracking control coil 32 being toward a fixed magnet 35 with touching the coil 32. Other members numbered identically with FIGS. 4-6 performing the same or similar functions, explanation on those members has been omitted. However, this embodiment is not provided with a tracking control yoke 33 and a damper 37 shown in FIGS. 4-6 turning means 31 for tracking control is comprised of the coil 32, the fixed magnet 35, a fixed yoke 36, and the magnetic substance 40.

The optical head apparatus of this embodiment operates as in the same way as that of one embodiment shown in FIGS. 4-6. Since an attraction force of fixed magnet 35 acting upon the magnetic substance 40 becomes the force to return a lens holder 15 to a neutral position, there is no need to provide a fragile damper in the optical head apparatus of this embodiment. As a result, there are great advantages that assembly efficiency by an automatic manufacturing machine and the like is to be increased because of no breakage in assembling the optical head apparatus, and that the damping performance is not liable to be changed owing to temperature. If the magnetic substance 40 is provided to the lens holder 15, in a plane perpendicular to the fixed magnet 35 with the central line of the pole 3, when the lens holder 15 is in the neutral position, the same or similar advantages can be obtained when the magnetic substance 40 is provided in other positions.

It is not intended that the type of tracking control in the embodiments in FIGS. 4-10 is limited to one with the actuator for objective lens that performs tracking control by sliding and turning the lens holder 15 with respect to the pole 3, other suitable types are available; such as, the type of performing tracking control while elastically supporting the objective lens 23 with a flat spring or the like, or the type of performing access of the disk 26 by the objective lens together with a light source, a light-receiving unit and the like. In addition, the disk 26 has been used as the optical recording medium, however, the present invention may be used in an optical head apparatus which scans a stationary optical card.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical head apparatus comprising:
a fixed body;
a moveable body translationally moveable relative to said fixed body;

a lens holder mounted on said moveable body and rotatable relative to said moveable body about a turning shaft;

an objective lens for condensing a light beam onto an optical recording medium, said objective lens having an optical axis parallel to said turning shaft and being mounted on said lens holder;

moving means for translationally moving said moveable body, said moving means comprising at least a first yoke and a first magnet mounted to said fixed body and at least a first moving coil mounted to said lens holder, said first moving coil having a hollow portion through which said first yoke passes; and turning means for generating a force for rotating said lens holder around a turning shaft parallel to said optical axis, said turning means comprising said first magnet and said first yoke and at least a first turning coil separate from said first moving coil mounted on said lens holder.

2. An optical head apparatus as set forth in claim 1 wherein said optical recording medium is supported by said fixed body.

3. An optical head apparatus as set forth in claim 1 wherein said moving means comprises first and second yokes and first and second magnets positioned on opposite sides of said moveable body, respectively, and mounted to said fixed body and first and second moving coils having a hollow portion mounted to said moveable body and position such that said first and second yokes pass through said hollow portions of said first and second coils, respectively.

4. An optical head apparatus as set forth in claim 3 wherein said turning means comprises first and second turning coils mounted to said lens holder adjacent said first and second yokes and wherein said first and said turning coils do not surround a yoke.

5. An optical head apparatus as set forth in claim 4 further comprising:

a power source for supplying an electric current to said first and second turning coils, and means for reversing a direction of an electrical current flowing in one of said first and second coils.

6. An optical head apparatus as set forth in claim 1 wherein said first turning coil is mounted on said lens holder in a position in which it is substantially freely rotatable about said turning shaft.

7. An optical head apparatus as set forth in claim 4 wherein said first and second turning coils are mounted on said lens holder in positions in which they are substantially freely rotatable about said turning shaft.

8. An optical head apparatus comprising:

a fixed body to which an optical recording medium is mounted;

an objective lens having an optical axis for condensing a light beam on said optical recording medium;

a lens holder for holding said objective lens a moving body translationally moveable with respect to said fixed body comprising a turning shaft parallel to said optical axis, said moving body supporting said lens holder rotatably about said turning shaft;

moving means for translationally moving said moving body with respect to said fixed body, said moving means comprising first and second magnets for creating first and second magnetic fields positioned on opposite sides of said moving body, first and second yokes positioned adjacent said first and second magnets, respectively, and fixed to said fixed body and first and second moving coils having a hollow portion through which said first and second yokes pass, respectively, said first and second moving coils being mounted to said moveable body on opposite sides thereof; and turning means comprising first and second turning coils separate from said first and second moving coils mounted to said lens holder and adjacent said first and second moving coils, respectively, said first and second turning coils positioned such that they are within said first and second magnetic fields, respectively.

9. An optical head apparatus as set forth in claim 8 further comprising:

a power source for supplying an electric current to said first and second turning coils; and means for reversing the direction of the electric current supplied to at least one of said first and second turning coils.

10. An optical head apparatus as set forth in claim 8 further comprising second moving means for moving said lens holder in a direction parallel to said optical axis of said objective lens.

11. An optical head apparatus as set forth in claim 10 wherein said means for reversing comprises a switch for reversing a current direction in one of said first and second turning coils.

12. An optical head apparatus as set forth in claim 8 wherein said first and second turning coils are positioned such that they are freely rotatable about said turning shaft.

* * * * *